(12) United States Patent
Ikeda

(10) Patent No.: US 10,935,914 B2
(45) Date of Patent: Mar. 2, 2021

(54) IMAGE PROCESSING APPARATUS AND IMAGE PROCESSING METHOD

(71) Applicant: SHARP KABUSHIKI KAISHA, Sakai (JP)

(72) Inventor: Hiroki Ikeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 52 days.

(21) Appl. No.: 16/521,946

(22) Filed: Jul. 25, 2019

(65) Prior Publication Data

US 2020/0073304 A1 Mar. 5, 2020

(30) Foreign Application Priority Data

Jul. 27, 2018 (JP) .............................. JP2018-141292

(51) Int. Cl.
*G03G 15/20* (2006.01)
*G03G 15/00* (2006.01)
*G03G 15/23* (2006.01)
*B41J 11/00* (2006.01)

(52) U.S. Cl.
CPC ....... *G03G 15/2064* (2013.01); *G03G 15/231* (2013.01); *G03G 15/657* (2013.01); *G03G 15/6552* (2013.01); *B41J 11/007* (2013.01); *G03G 2215/00299* (2013.01)

(58) Field of Classification Search
CPC . G03G 2215/00299; G03G 15/60–607; G03G 21/04–046
See application file for complete search history.

(56) References Cited

U.S. PATENT DOCUMENTS

| | | | | |
|---|---|---|---|---|
| 4,811,047 A | * | 3/1989 | Hosaka | G03G 15/04 399/14 |
| 2007/0297013 A1 | * | 12/2007 | Nakagawa | H04N 1/00867 358/3.28 |
| 2012/0038941 A1 | * | 2/2012 | Megawa | G06F 21/608 358/1.13 |
| 2018/0285040 A1 | * | 10/2018 | Shintani | G06F 3/1207 |

FOREIGN PATENT DOCUMENTS

JP 2010-066698 A 3/2010

OTHER PUBLICATIONS

U.S. Department of Energy, Headquarters Facilities Master Security Plan—Chapter 5, Classified Matter Protection and Control, (Sep. 2020) (available at: https://www.energy.gov/sites/prod/files/2020/09/f78/HQFMSP-Chapter-5-Classified-Matter-Protection-and-Control-Sep-2020.pdf) (section 508).*

* cited by examiner

*Primary Examiner* — Sevan A Aydin
(74) *Attorney, Agent, or Firm* — ScienBiziP, P.C.

(57) ABSTRACT

An image processing apparatus includes an image reading unit that reads an image of an original document, an image processing unit that processes image data of the image read by the image reading unit, and a suspension unit that suspends, if a predetermined pattern has been detected from the image read by the image reading unit, the image processing unit in an operation of processing the image data until the original document is removed from the image reading unit.

14 Claims, 11 Drawing Sheets

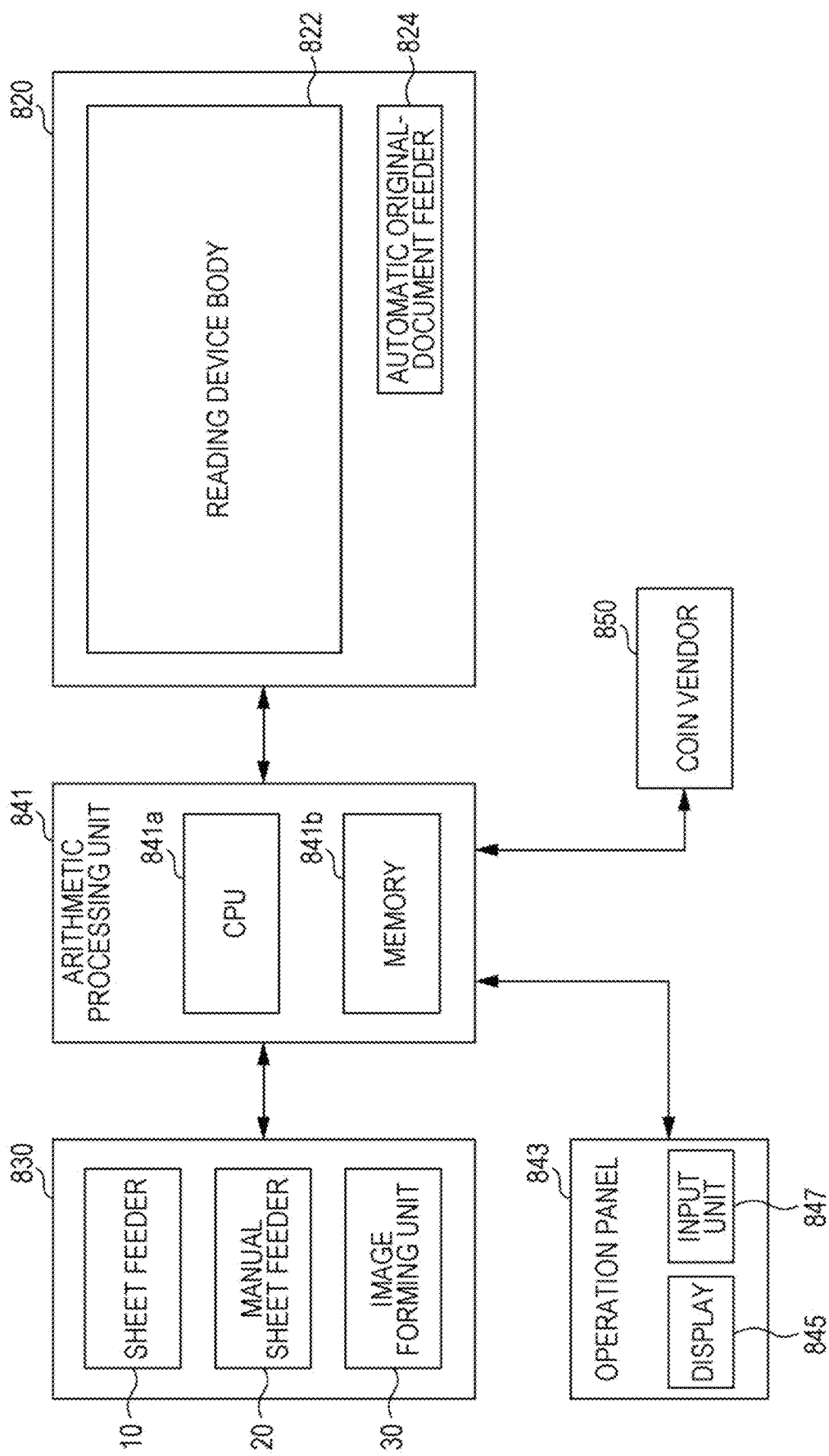

FIG. 4

INVOICE

PQR CORPORATION  
COMPANY REPRESENTATIVE: MR. TANAKA

SUBJECT: ONE SET OF OFFICE EQUIPMENT  
PLEASE BE ADVISED THAT YOUR PAYMENT IS LISTED BELOW.

INVOICE NO.   2018-1234  
DATE:   APRIL 10, 2018

STU CORPORATION  
160-0022  
SHINJUKU FIRST BUILDING 2F  
1-2-3 SHINJUKU, SHINJUKU-KU, TOKYO, JAPAN  
TEL: 03-●●●●-●●●●  
FAX: 03-●●●●-●●●●  
E-Mail: info@pqr-aaa.co.jp  
PERSON IN CHARGE: MR. SATOH

TOTAL   $447.90   (TAX INCLUDED)   PAYMENT DEADLINE: MAY 31, 2018

| No. | PRODUCT NAME | QTY | COST | AMOUNT |
|---|---|---|---|---|
| 1 | DESK | 1 | 200.00 | $200.00 |
| 2 | CHAIR | 4 | 60.00 | $240.00 |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   |   |   |

BANK DETAILS  
  DCF BRANCH, ABC BANK  
  BANK ACCOUNT NUMBER  
  *0123456  
  STU CORPORATION

| SUBTOTAL | $440.00 |
|---|---|
| TAX | $3.50 |
| INCOME TAX | $4.40 |
| TOTAL | $447.90 |

| REMARKS | |
|---|---|

FIG. 7

COMPANY SECRET

FIG. 8

| MEETING MINUTES | | YEAR |
|---|---|---|

DATE

| DEPARTMENT | NAME |
|---|---|

(1) MEETING

| DATE | |
|---|---|
| LOCATION | |
| ATTENDEES | |

(2) PROCEEDINGS

| SUBJECT |
|---|
| |
| CONTENTS OF PROCEEDINGS |
| |
| DECISION |
| |

| ATTACHED DOCUMENT | |
|---|---|

TOP SECRET

IMAGE PROCESSING APPARATUS AND IMAGE PROCESSING METHOD

BACKGROUND

1. Field

The present disclosure relates to image processing apparatuses and image processing methods and in particular to an image processing apparatus that copies an image.

2. Description of the Related Art

A typical multi-function apparatus of the related art has image processing functions. The image processing functions include an original document reading function, an image forming function, an original document copying function based on the original document reading function and the image forming function, a fax function, an image downloading function to download an image from a server via the Internet, and an image receiving function to receive an image from a mobile terminal, such as a smart phone, via wireless local area network (LAN), near field communication (NFC), Bluetooth (registered trademark) or the like. Such multi-function apparatuses are installed not only in offices, but also in convenience stores and public spaces. Multi-function apparatuses in public spaces may be used by everyone.

There is a demand that a multi-function apparatus installed in a public space be used to copy secret information. For example, an individual may go to a public space to copy printed matter containing personal information. Also, a salesperson in a sales division of a company may use a multi-function apparatus installed in a public space in his or her responsible business area to copy a sales document. Such a document may contain the trade secret of a company, the trade secret of a customer company, or the personal information of an individual.

As long as a user carefully uses a multi-function apparatus, an original document may not be left on an original document reading apparatus after being read. In practice, however, the user may possibly forget the original document.

The original document reading apparatus desirably has a function that precludes the user from leaving an original document there.

Japanese Unexamined Patent Application Publication No. 2010-66698 discloses an image forming apparatus. The image forming apparatus holds in the housing thereof a recording medium having an image read from an original document and notifies a user that the removal of the original document is not recognized if a recognition unit does not recognize the removal of the original document from a reading unit having read the original document. Since the image forming apparatus holds in the housing thereof the recording medium having the read image, there is a possibility that the image formed on the recording medium may draw somebody's attention. This is undesirable from the security standpoint.

It is desirable to provide an image forming apparatus which precludes a user from leaving an original document on the image forming apparatus and an image forming method for the image forming apparatus.

SUMMARY

According to an aspect of the disclosure, there is provided an image processing apparatus. The image processing apparatus includes an image reading unit that reads an image of an original document, an image processing unit that processes image data of the image read by the image reading unit, and a suspension unit that suspends, if a predetermined pattern has been detected from the image read by the image reading unit, the image processing unit in an operation of processing the image data until the original document is removed from the image reading unit.

According to another aspect of the disclosure, there is provided an image processing apparatus. The image processing apparatus includes an image reading unit that reads an image of an original document, a removal determination unit that determines whether the original document has been removed from the image reading unit, a user determination unit that determines whether a user is a predetermined user, and a suspension unit that, with the user determined to be the predetermined user, performs an image processing operation if the original document is determined as being removed from the image reading unit or suspends the image processing operation if the original document is determined as being not removed from the image reading unit.

According to another aspect of the disclosure, there is provided an image processing method. The image processing method includes reading an image of an original document on an image reading unit, processing image data of the image read in the reading, and if a predetermined pattern has been detected from the read image in the reading, suspending processing of the image data until the original document is removed from the image reading unit.

According to another aspect of the disclosure, there is provided an image processing method. The image processing method includes reading an image of an original document on an image reading unit, determining whether the original document has been removed from the image reading unit, determining whether a user is a predetermined user, and with the user determined to be the predetermined user, performing an image processing operation if the original document is determined as being removed from the image reading unit or suspending the image processing operation if the original document is determined as being not removed from the image reading unit.

According to another aspect of the disclosure, there is provided a non-transitory computer readable medium. The non-transitory computer readable medium stores a program causing a computer to operate as the image processing apparatus.

BRIEF DESCRIPTION OF THE DRAWINGS

FIG. 2 is a functional block diagram of the multi-function apparatus of the first embodiment of the disclosure;

FIG. 4 illustrates an original document including a first example of a predetermined pattern of the disclosure;

FIG. 7 illustrates an original document including a fourth example of the predetermined pattern of the disclosure;

FIG. 8 illustrates an original document including a fifth example of the predetermined pattern of the disclosure.

DESCRIPTION OF THE EMBODIMENTS

Embodiments of the disclosure are described in detail with reference to the drawings.

First Embodiment

Figure 1:
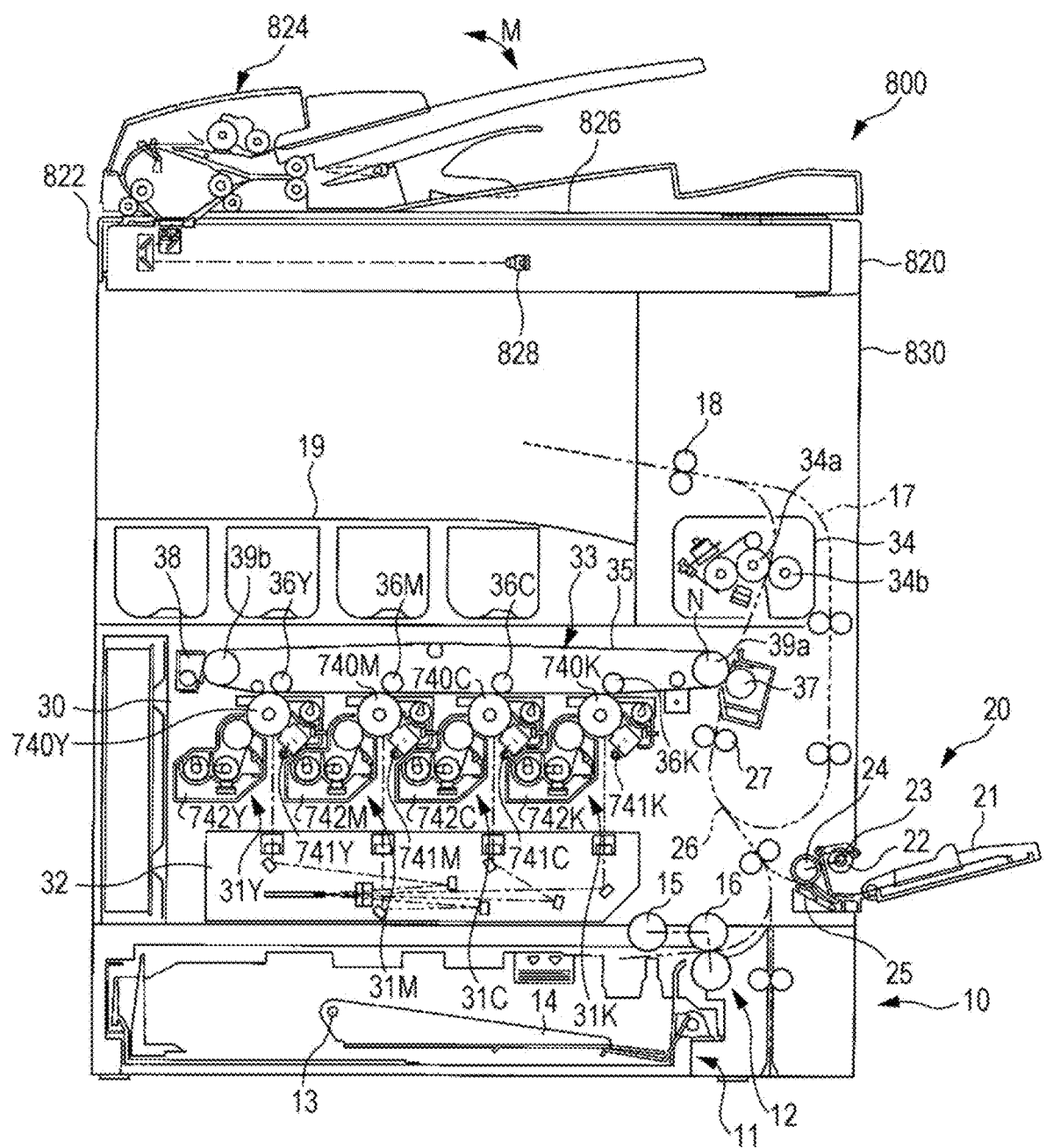
FIG. 1 is a cross-sectional view of a multi-function apparatus of a first embodiment of the disclosure.

A first embodiment of the disclosure relates to a multi-function apparatus 800. FIGS. 1 and 2 illustrate the configuration of the multi-function apparatus 800.

Referring to FIGS. 1 and 2, the multi-function apparatus 800 includes an original-document reading device 820, a multi-function apparatus body (image forming unit body) 830, an operation panel 843, a coin vendor 850, and an arithmetic processing unit 841. The original-document reading device 820 reads an image of an original document. The multi-function apparatus body 830 forms an image on a sheet. The operation panel 843 operates the original-document reading device 820 and the multi-function apparatus body 830. The arithmetic processing unit 841 controls the original-document reading device 820 and the multi-function apparatus body 830 in response to an operation performed on the operation panel 843.

The original-document reading device 820 may be used alone to read an image of an original document. The multi-function apparatus body 830 may be used alone to form an image on a sheet. Alternatively, the original-document reading device 820 and the multi-function apparatus body 830 may be used in concert with each other to copy an image. The multi-function apparatus 800 may include a storage device (not illustrated) and/or a fax device (not illustrated). The storage device may store an image read by the original-document reading device 820 and/or an image received by the fax device. The fax device may transmit an image read by the original-document reading device 820 and an image stored on the storage device and/or may receive an image. The multi-function apparatus 800 may also include an interface that is connected to a personal computer via a network. The personal computer connected to the multi-function apparatus 800 may use a function of the multi-function apparatus on data that is managed by the computer.

The original-document reading device 820 includes a single pass feeder (SPF) 824 that automatically feeds an original document and a reading device body 822 that reads the image of the original document. In addition to the elements in FIG. 2, the original-document reading device 820 includes elements illustrated in FIG. 1 but not illustrated in FIG. 2. Referring to FIG. 1, the reading device body 822 includes a document platen 826.

The multi-function apparatus body 830 includes a sheet feeder 10 that feeds a sheet, a manual sheet feeder 20 that receives a manually fed sheet, and an image forming unit 30 that forms an image on a sheet fed by the sheet feeder 10 or the manual sheet feeder 20.

The sheet feeder 10 includes a sheet tray 11 that holds a stack of sheets and a pickup and transport unit 12 that picks up sheets stacked in the sheet tray 11 one by one and transports each sheet. The sheet tray 11 includes a raising plate 14. The raising plate 14 has a rotary shaft 13 and is pivotally supported by the rotary shaft 13. When each sheet is transported, the raising plate 14 is pivotally rotated to raise the sheet. The pickup and transport unit 12 includes a pickup roller 15 and a pair of separation rollers 16 that separate the sheets transported by the pickup roller 15 one from another.

The manual sheet feeder 20 includes a manual feed tray 21 used to receive a stack of sheets and a separation and transport unit 22 that separates and transports the sheets stacked in the manual feed tray 21 one by one. The manual feed tray 21 is rotatably supported by the multi-function apparatus body 830. When sheets are fed, the manual feed tray 21 is fixed at a predetermined angle to receive the sheets. The separation and transport unit 22 includes a pickup roller 23 that transports the sheets stacked in the manual feed tray 21 and a separation roller 24 and a separation pad 25 that separate the sheets one from another to be transported by the pickup roller 23.

The image forming unit 30 includes four process cartridges 31Y, 31M, 31C, and 31K for yellow (Y), magenta (M), cyan (C), and black (K) color images, photoconductor drums 740Y, 740M, 740C, and 740K, an exposure device 32 that exposes the surface of the photoconductor drums, a transfer unit 33 that transfers to a sheet the toner images formed on the photoconductor drums 740Y through 740K, and a fixing unit 34 that fixes the transferred toner images onto the sheet. Suffix letters Y, M, C, and K of the reference numerals respectively represent yellow, magenta, cyan, and black colors.

Each of the four process cartridges 31Y through 31K is removable from the multi-function apparatus body 830 and replaceable. Since the four process cartridges 31Y through 31K are identical to each other except for the image colors handled thereby, only the process cartridge 31Y forming a yellow (Y) image is described and the discussion of other process cartridges 31M through 31K is omitted.

The process cartridge 31Y includes the photoconductor drum 740Y serving as an image carrier, a charging device 741Y charging the photoconductor drum 740Y, a development device 742Y developing an image from an electrostatic latent image formed on the photoconductor drum 740Y, and a drum cleaner removing toner remaining on the surface of the photoconductor drum 740Y. The development device 742Y includes a development device body (not illustrated in detail) developing the image on the photoconductor drum 740Y and a toner cartridge (not illustrated in detail) supplying toner to the development device body. The toner cartridge is removably mounted on the development device body. When the toner cartridge is running out of toner, the toner cartridge is taken out of the development device body and then replaced with another toner cartridge.

The exposure device 32 includes a light source (not illustrated) radiating laser light and multiple mirrors (not illustrated) guiding the laser light to the photoconductor drums 740Y through 740K. The transfer unit 33 includes an intermediate transfer belt 35 that carries the toner images formed on the photoconductor drums 740Y through 740K, primary transfer rollers 36Y through 36K that primarily transfer the toner images formed on the photoconductor drums 740Y through 740K to the intermediate transfer belt 35, a secondary transfer roller 37 that secondarily transfers to a sheet the toner images transferred onto the intermediate transfer belt 35, and a belt cleaner 38 that removes toner remaining on the intermediate transfer belt 35. The intermediate transfer belt 35 is entrained about a driving roller 39a and a driven roller 39b and is pressed against the photoconductor drums 740Y through 740K respectively by the primary transfer rollers 36Y through 36K. The intermediate transfer belt 35 is transported into a nip N between the secondary transfer roller 37 and the driving roller 39a. The intermediate transfer belt 35 transfers the toner images carried thereby to the sheet at the nip N. The fixing unit 34 includes a heater roller 34a heating the sheet and a pressure roller 34b pressing against the heater roller 34a.

The operation panel 843 includes a display 845 displaying predetermined information and an input unit 847 that a user uses to input a command to the original-document reading device 820 and the multi-function apparatus body 830. In accordance with the first embodiment, the operation panel 843 is mounted on the front side of the reading device body 822. The front side of the reading device body 822 corresponds to the front side of the page of FIG. 1 and the rear side of the reading device body 822 corresponds to the rear side of the page of FIG. 1.

Referring to FIG. 2, the arithmetic processing unit 841 includes a central processing unit (CPU) 841a that controls the sheet feeder 10, the manual sheet feeder 20, the image forming unit 30, and the original-document reading device 820, and a memory 841b that stores a variety of programs used to operate the CPU 841a and a variety of information used by the CPU 841a. In response to an operation performed on the operation panel 843 by the user, the arithmetic processing unit 841 controls in coordination the operations of the sheet feeder 10, the manual sheet feeder 20, the image forming unit 30, and the original-document reading device 820 to form an image on a sheet.

An image forming process performed by the multi-function apparatus 800 thus constructed (image forming control performed by the arithmetic processing unit 841) is described below. In accordance with the first embodiment, the image forming process is performed. In the image forming process, the reading device body 822 reads the original document fed by the SPF 824, thereby resulting in an image of the original document. The image forming unit 30 forms the image on the sheet fed by the sheet feeder 10.

When the user inputs a command on the input unit 847 of the operation panel 843, an image forming start signal is provided. The original document placed in the SPF 824 by the user is automatically transported to an original document read location and the reading device body 822 reads the image at the original document read location.

When the image of the original document is read by the reading device body 822, the exposure device 32 radiates multiple laser beams respectively to the photoconductor drums 740Y through 740K. The photoconductor drums 740Y through 740K are charged in advance by the charging devices 741Y through 741K. When the photoconductor drums 740Y through 740K are irradiated with the corresponding laser beams, corresponding electrostatic latent images are respectively formed on the photoconductor drums 740Y through 740K. In response to the electrostatic latent images formed on the photoconductor drums 740Y through 740K, the development devices 742Y through 742K develop yellow (Y), magenta (M), cyan (C), and black (K) toner images respectively on the photoconductor drums 740Y through 740K. The toner images formed on the photoconductor drums 740Y through 740K are transferred in superimposition onto the intermediate transfer belt 35 by the primary transfer rollers 36Y through 36K. The superimposed toner images (a full-color toner image) are carried by the intermediate transfer belt 35 to the nip N.

In parallel with the image forming process, the sheets stacked in the sheet tray 11 are separately picked up one by one by the pickup and transport unit 12 and then transported to a sheet transport path 26 by the pickup roller 15. A timing roller pair 27 located upstream of the nip N along the sheet transport path corrects the skewing of the sheet and the sheet is then transported to the nip N at a predetermined transport timing. The secondary transfer roller 37 transfers the full-color toner image carried by the intermediate transfer belt 35 to the sheet at the nip N.

The fixing unit 34 fuses the transferred image to fix the transferred image onto the sheet using heat and pressure. The sheet is then discharged by a discharge roller pair 18. The sheet discharged is stacked in a discharge sheet tray 19.

If images are formed on both sides (first side and second side) of a sheet, the sheet having an image formed on the first side is transported, before being discharged, to a duplex transport path 17 by rotating the discharge roller pair 18 in a reverse direction and is then transported to the image forming unit 30 along the duplex transport path 17. Like on the first side, an image is formed on the second side and the sheet is discharged. The sheet discharged is stacked on the discharge sheet tray 19.

An image copying process performed by the multi-function apparatus is described with reference to FIGS. 3A and 3B.

A user may now use the multi-function apparatus installed in a public space and may be billed in a billing process in one of multiple billing modes. The billing modes include a pay-as-you-go billing mode and a monthly billing mode. In the pay-as-you-go billing mode, copying starts only after a payment amount in cash equal to or above a copy fee is entered into the coin vendor 850. In the monthly billing mode, a monthly sum of fees for copying is billed to a registered corporation or the like at the end of every month.

When the user has put money into the coin vendor 850, the multi-function apparatus starts operating in the pay-as-you-go billing mode.

The multi-function apparatus has multiple types of authentication functions (including an authentication function using an identification (ID) and password and an authentication function using an integrated circuit (IC) card). If the user is found to be an employee of a registered corporation via one of the functions, the multi-function apparatus starts operating in the monthly billing mode.

The multi-function apparatus starts operating in one of the billing modes and the user places an original document on the document platen of the original-document reading device 820. When the user presses a copy execution button displayed on the operation panel of an operation screen (steps S1-1 and S1-2), the arithmetic processing unit 841 of the multi-function apparatus checks the billing mode of the billing process (step S1-3).

If the arithmetic processing unit 841 determines that the multi-function apparatus performs the billing process in the monthly billing mode (yes branch from step S1-3), the arithmetic processing unit 841 sets a detection mode to be "active" and then proceeds to step S1-5.

If the arithmetic processing unit 841 determines that the multi-function apparatus is performing the billing process in the pay-as-you-go billing mode, the arithmetic processing unit 841 proceeds to step S1-5 while keeping the initial setting in the detection mode "inactive."

In step S1-5, the arithmetic processing unit 841 outputs a copy instruction to the image forming unit 30.

Upon receiving the copy instruction from the arithmetic processing unit 841, the image forming unit 30 determines whether the detection mode is active or not active (step S1-6). This determination operation may be performed by the arithmetic processing unit 841 rather than by the image forming unit 30.

If the detection mode is not active (no branch from step S1-6), the image forming unit 30 performs a copy operation as usual (step S1-14). Specifically, in step S1-1, the original-document reading device 820 reads the original document placed on the document platen of the original-document reading device 820, and the image forming unit 30 forms an image on a print medium, such as a paper sheet, in accordance with the original document read.

If the detection mode is active (yes branch from step S1-6), the original-document reading device 820 reads the original document placed on the platen of the original-document reading device 820 in step S1-1 (step S1-7).

The original-document reading device 820 determines whether the original document read in step S1-7 includes a predetermined pattern (step S1-8). The predetermined pattern is described later. This determination operation may be performed by the arithmetic processing unit 841 rather than by the original-document reading device 820.

If the pattern is not detected (no branch from step S1-8), the image forming unit 30 forms the image on a print medium, such as a paper sheet, in accordance with the original document read by the original-document reading device 820 in step S1-7 (step S1-13).

If the pattern is detected (yes branch from step S1-8), the original-document reading device 820 verifies whether the original document has been retrieved from the document platen (whether the original document has been removed from the document platen) (step S1-9). This operation is repeated until the retrieval (removal) of the original document is detected. This verification operation may be performed by the arithmetic processing unit 841 rather than by the original-document reading device 820. The detection of the retrieval (or removal) may be actually performed by an original document sensor mounted on or near the document platen. The original document sensor may or may not have a function of detecting the size of the original document. While the original document remains unretrieved (no path in step S1-9), the operation in step S1-9 is repeated. Each time the operation is performed in step S1-9, the original document sensor tries to sense the original document. If the original document is detected, the original-document reading device 820 determines that the original document remains unretrieved. If the original document is not detected, the original-document reading device 820 determines that the original document has been retrieved.

While the retrieval of the original document is not detected, the determination operation in step S1-9 follows no path and is thus repeated again. The original-document reading device 820 notifies the arithmetic processing unit 841 that the original document remains unretrieved (step S1-9*b*).

In response to an instruction from the arithmetic processing unit 841 that has been notified of the unretrieved original document (step S1-10), the operation panel 843 displays a message prompting the user to retrieve the original document (step S1-11). For example, the message may be one of the followings: "Please retrieve the original document from the document platen"; "Please retrieve the original document from the document platen. Printing will start after the retrieval"; "Confidential document is left on the document platen. Please retrieve the original document from the document platen. Printing will start after the retrieval"; and "Printing is disabled because a confidential document is left on the document platen. Please retrieve the document." The word "retrieve" may be replaced with the word "remove." The corresponding voice message may be output in addition to or in place of the displayed message.

When the user has retrieved the original document from the document platen (step S1-12), the retrieval is detected (yes branch from step S1-9). The image forming unit 30 forms an image on a printing medium, such as a paper sheet, in accordance with the original document read in step S1-7.

The print medium, such as a paper sheet, having an image formed thereon is discharged into the discharge tray and then retrieved by the user (step S1-15).

The arrangement described above is free from the operation in which the user retrieves only the print medium, such as the paper sheet, having the image formed thereon while leaving the original document on the document platen.

Rather than forming an image on the print medium such as a paper sheet in step S1-13, an image may be transmitted via fax, an image may be transmitted via email, or image data may be written on a recording medium, such as a hard disk or a memory card. The user may recognize in advance the manner how and the location where the image data is output. If the message indicating the outputting is not present, the user may be aware that the outputting is not complete yet. If the operation in step S1-13 is changed in this way, the original-document image thus copied is output in step S1-14 in a way corresponding to the way in step S1-13. Specifically, instead of pressing the copy button in step S1-1, the user selects one of the fax transmission operation, the email transmission operation, and the writing operation on the recording medium.

Second Embodiment

Even if the retrieval of the original document is undetected, the message prompting the user to retrieve the original document (step S1-11) may not be displayed until a predetermined time period has elapsed since the end of the reading of the original document (step S1-7). If the state in which the retrieval of the original document is undetected continues over the predetermined time period from the end of the reading of the original document, the message prompting the user to retrieve the original document (step S1-11) may be displayed.

Third Embodiment

If the displaying of the message prompting the user to retrieve the original document (step S1-11) is accompanied by a corresponding voice message, the voice message may be snoozed. Even if the voice message is output in addition to or instead of displaying the message prompting the user to retrieve the original document (step S1-11), the voice message may also be snoozed.

Fourth Embodiment

There is a possibility that the print medium, such as the paper sheet, having an image formed thereon remains in the discharge tray even after the original document is retrieved from the document platen. A sensor may be used to detect the print medium and a message alerting the user to the remaining recording medium may be displayed on a screen and/or may be output in voice.

The user may log in with their ID card placed on the multi-function apparatus. When the ID card is later removed from the multi-function apparatus, the print medium, such as a paper sheet, having an image formed thereon may still remain in the discharge tray. In such a case, the corresponding alerting message may be displayed on the screen and/or output in voice.

If the print medium, such as a paper sheet, having an image formed thereon is discharged in the discharge tray after the original document is retrieved, a corresponding alerting message may be displayed on the screen and/or output in voice.

A sensor detecting the presence of the user near the multi-function apparatus may be mounted on the multi-function apparatus. When the user leaving the multi-function apparatus is detected in response to an output from the sensor, the print medium, such as a paper sheet, having an image formed thereon may still remain in the discharge tray. In such a case, a corresponding alerting message may be displayed on the screen and/or output in voice.

Fifth Embodiment

In accordance with the first embodiment, the determination operation as to whether the original document read in step S1-7 includes the predetermined pattern is performed by the original-document reading device 820 or the arithmetic processing unit 841.

In accordance with a fifth embodiment, the determination operation is performed by another apparatus, such as a server, connected to the multi-function apparatus via a network. A cloud server may be used as the other apparatus.

The use of a server common to multiple multi-function apparatuses sets the user free from managing a predetermined pattern on a per multi-function apparatus basis. In particular, when a predetermined pattern is modified or added, a pattern managed by the server or a determination program running on the server is simply modified or added.

Sixth Embodiment

Figure 3A:
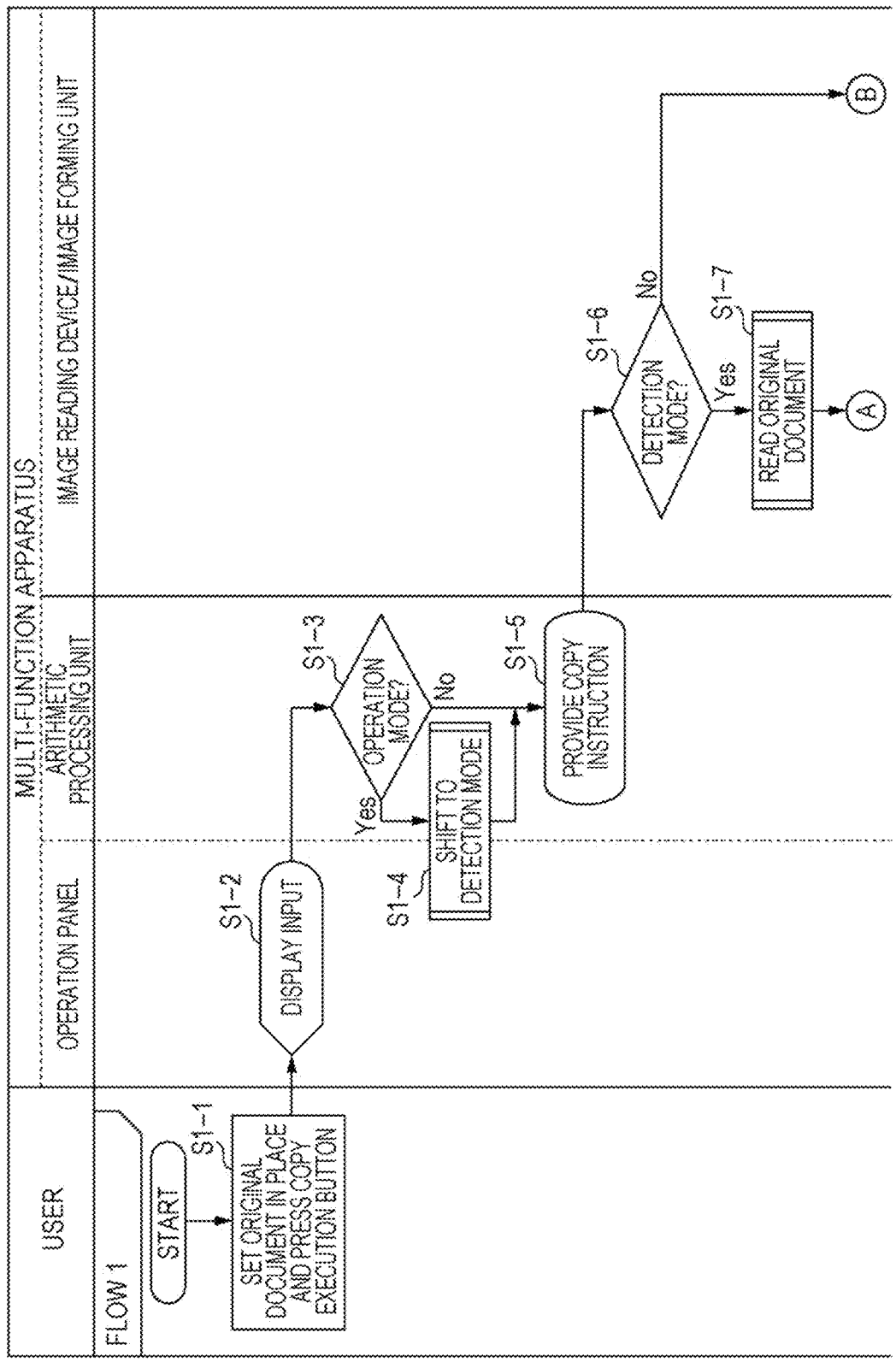
FIG. 3A is a flowchart illustrating an image copying process performed by the multi-function apparatus of the first and sixth embodiments of the disclosure.
Figure 3B:
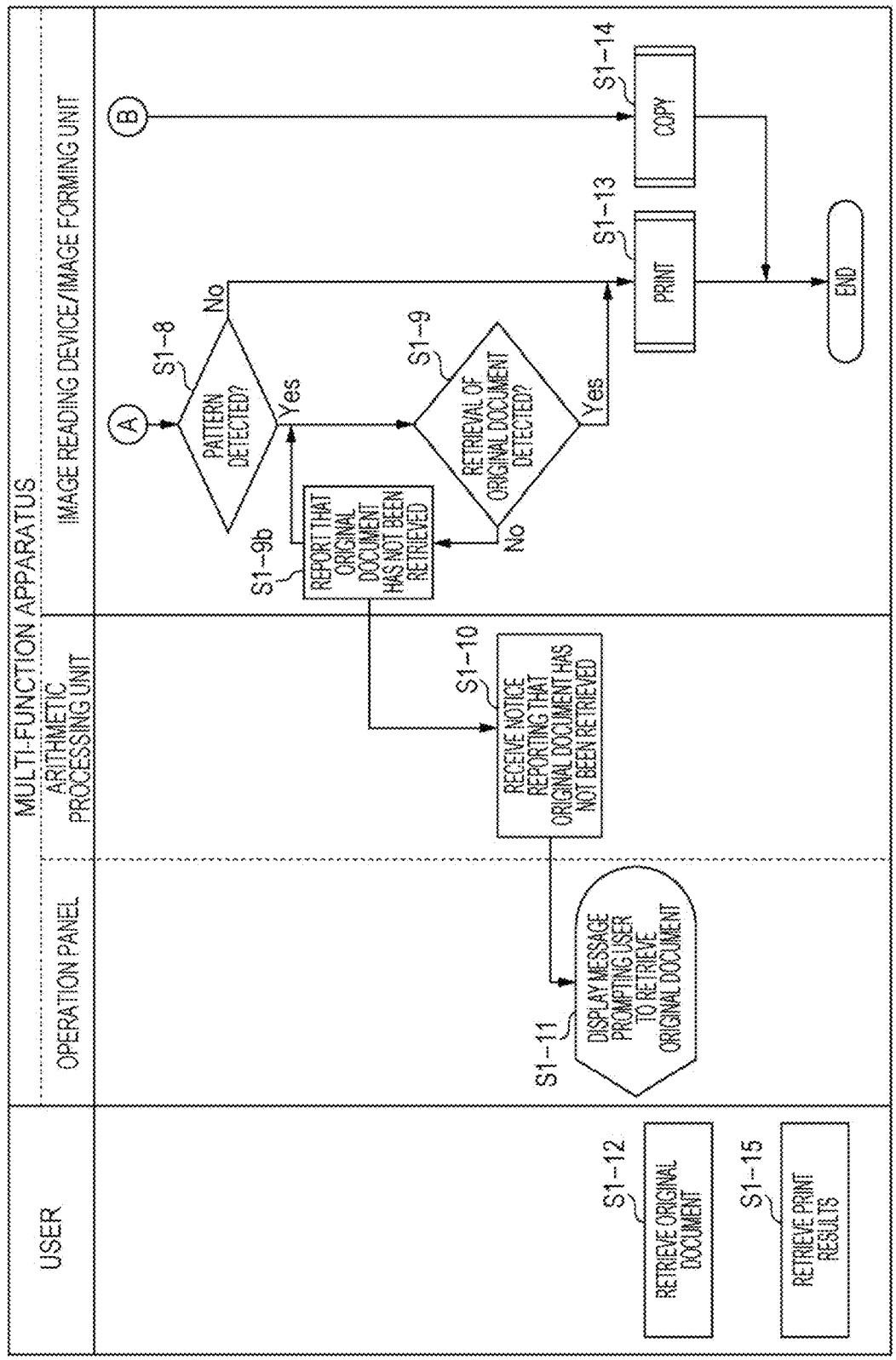
FIG. 3B is other flowchart illustrating the image copying process performed by the multi-function apparatus of the first embodiment of the disclosure.
Figure 3C:
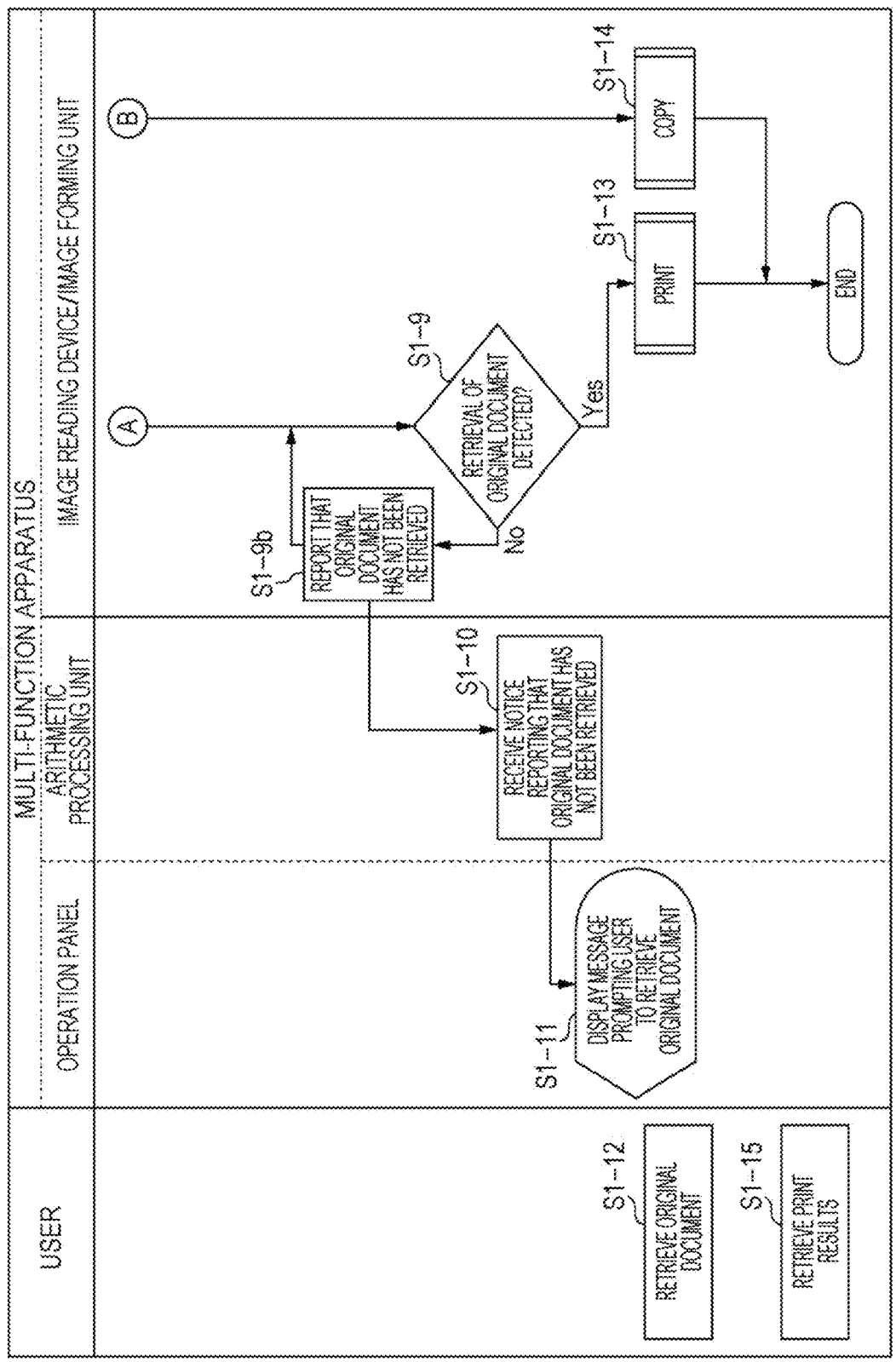
FIG. 3C is another flowchart illustrating an image copying process performed by the multi-function apparatus of the sixth embodiment of the disclosure.

The process of a sixth embodiment is illustrated in FIGS. 3A and 3C. The process of the first embodiment is illustrated in FIGS. 3A and 3B.

The process of the sixth embodiment is different from the process of the first embodiment in that the process of the sixth embodiment is without the pattern detection step in S1-8.

The determination operation in step S1-6 in which the detection mode is determined to be active means that the multi-function apparatus performs the billing process in the monthly billing mode. In such a case, a company to be billed has been identified. The current user is thus found to be an employee of the identified company that is a billing destination.

In such a case, the pattern detection operation in step S1-8 is omitted and proceeding advances to step S1-9. If the current user is the employee of the company identified as the billing destination, operations in step S1-9 and subsequent steps are performed to prompt the user to retrieve the original document regardless of whether the original document includes a predetermined pattern.

The operations in step S1-9 and subsequent steps are identical those of the first embodiment and the discussion thereof is omitted herein.

First Example

FIG. 4 illustrates a first example of the predetermined pattern. The predetermined pattern is a character string "invoice." A character string "quotation" (not illustrated) may also be a predetermined pattern.

A character string encountered in an invoice or quotation may also be considered as a predetermined pattern.

A character string of a company name may be recognized as the predetermined pattern. In particular, the company name of a company corresponding to a user ID may be recognized as the predetermined pattern and the company name of a company not corresponding to the user ID may not be recognized as the predetermined pattern.

The company name of a customer company of the company corresponding to the user ID may be recognized as the predetermined pattern.

A phone number, a fax number, and/or an email address may be recognized as the predetermined pattern. In particular, a phone number, a fax number, and/or an email address of a company corresponding to a user ID may be recognized as the predetermined pattern and a phone number, a fax number, and/or an email address of a company not corresponding to the user ID may not be considered as the predetermined pattern.

Furthermore, a phone number, a fax number, and/or an email address of a customer company of the company corresponding to the user ID may be considered as the predetermined pattern.

An amount of money equal to or above a predetermined amount may be recognized as a predetermined pattern.

The character string of an accounting term may be recognized as a predetermined pattern.

The character string of a bank account may be recognized as a predetermined pattern.

Second Example

Figure 5:
FIG. 5 illustrates an original document including a second example of the predetermined pattern of the disclosure.

FIG. 5 illustrates a second example of the predetermined pattern. The logo of a company is the predetermined pattern. In particular, the logo of the company corresponding to the user ID is the predetermined pattern.

Third Example

Figure 6:
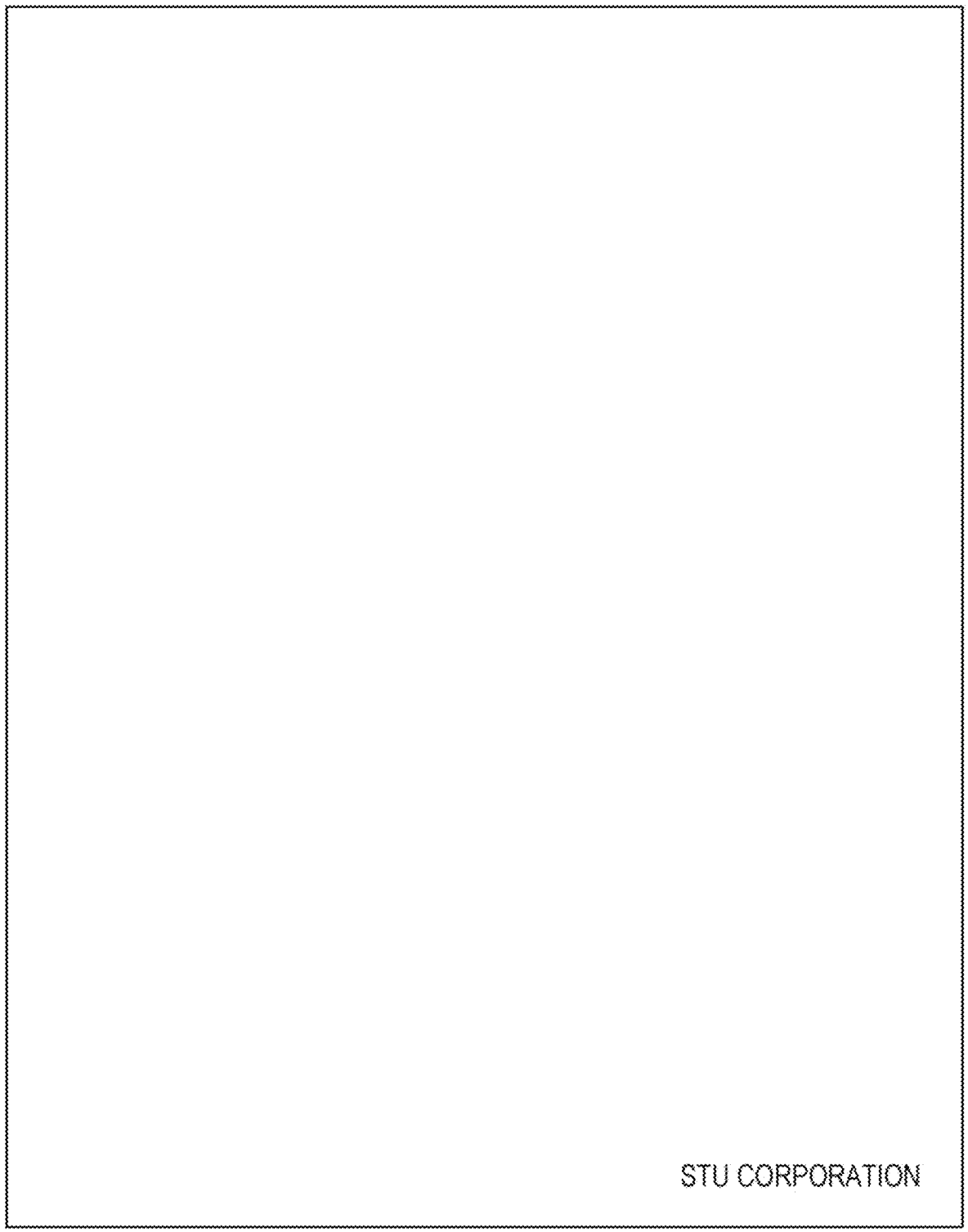
FIG. 6 illustrates an original document including a third example of the predetermined pattern of the disclosure.

FIG. 6 illustrates a third example of the predetermined pattern. The name of a company is the predetermined pattern. In particular, the name of the company corresponding to the user ID is the predetermined pattern.

Only if the company name is at a predetermined location (such as a header or a footer), the company name is recognized as the predetermined pattern.

Fourth Example

Figure 7:
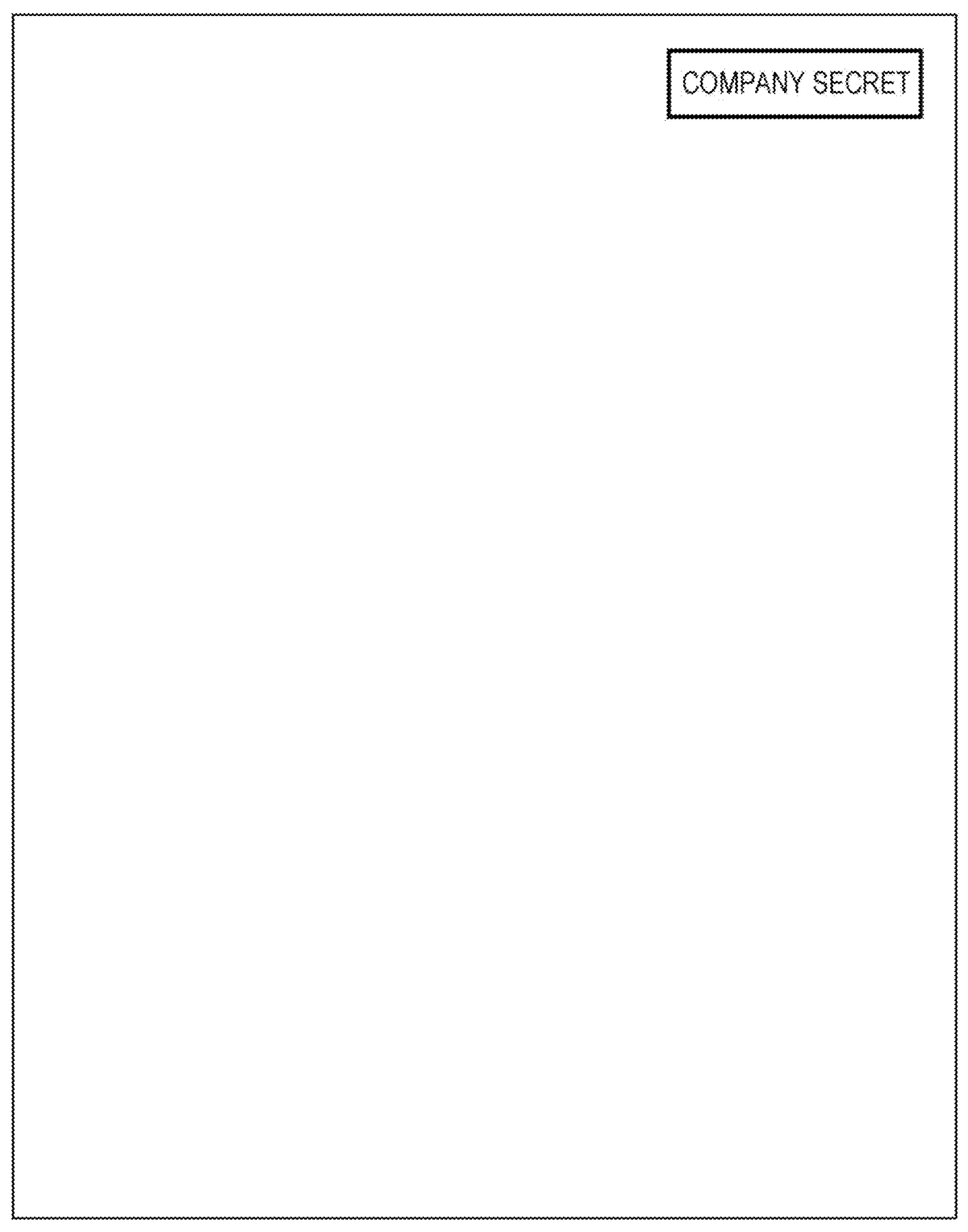

FIG. 7 illustrates a fourth example of the predetermined pattern. The character "company secret" indicating a trade secret document is the predetermined pattern. For example, not illustrated, the circled character such as "secret," "top secret," or "for internal use only" may be recognized as the predetermined pattern.

Fifth Example

FIG. 8 illustrates a fifth example of the predetermined pattern. The watermark characters "top secret" indicating a trade secret document are the predetermined pattern. The circled Watermark characters "secret," "top secret," or "for internal use only" (not illustrated) may be recognized as the predetermined pattern.

Sixth Example

Figure 9:
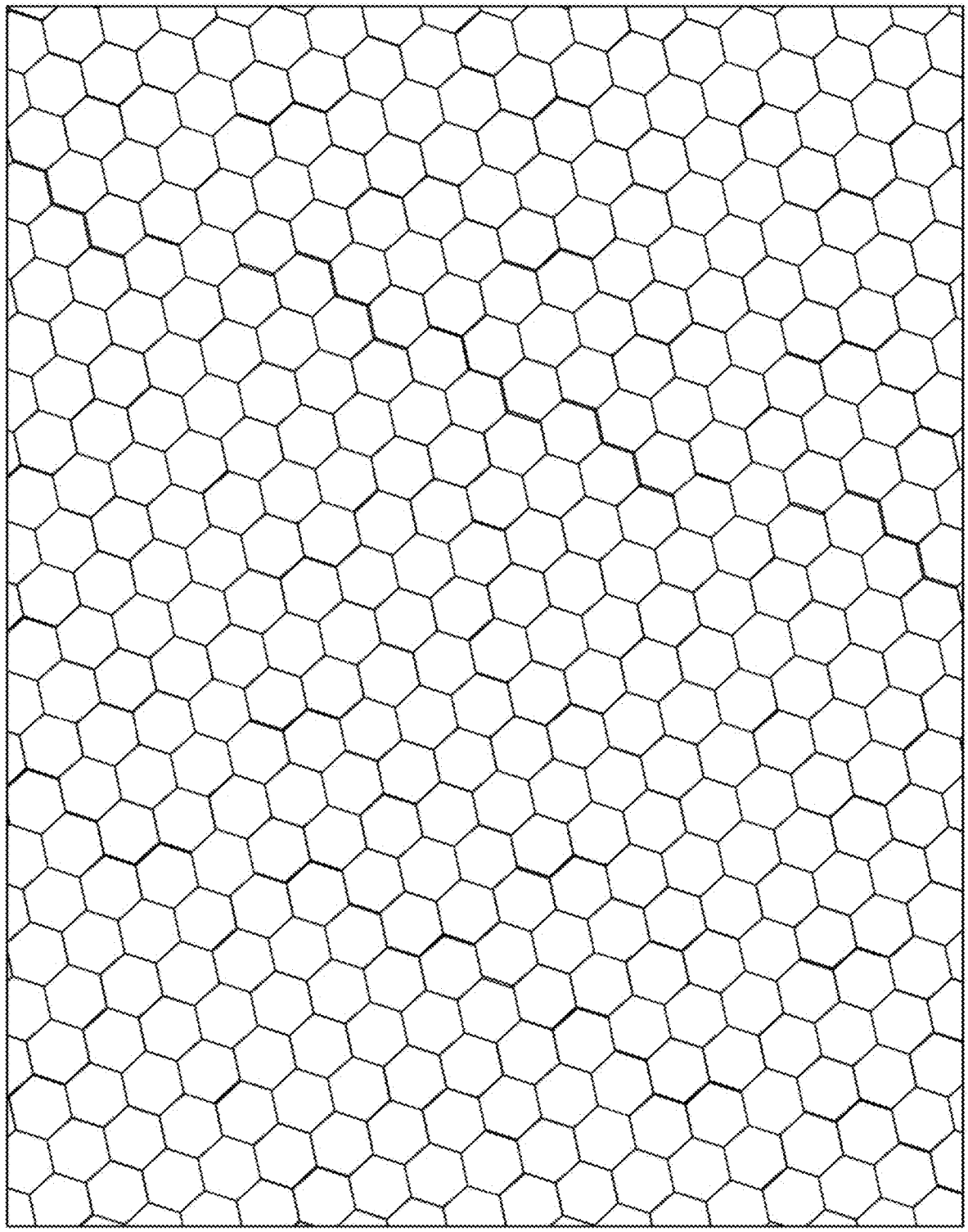
FIG. 9 illustrates an original document including a sixth example of the predetermined pattern of the disclosure.

FIG. 9 illustrates a sixth example of the predetermined pattern. A predetermined geometric pattern may be recognized as the predetermined pattern.

Seventh Example

A pattern identifying a contract, driver's license, ID card, bank book, residence certificate, family register or a registration document may be recognized as the predetermined pattern.

A character string indicating a document containing information related to personal information may be recognized as the predetermined pattern.

The image processing apparatus may be implemented by using hardware, software, or a combination thereof. The image processing method of the image processing apparatus may be implemented by hardware, software, or a combination thereof. The implementation using software is performed by a computer that reads a program.

The program may be supplied to a computer by using a variety of types of non-transitory computer readable media having stored the program. The non-transitory computer readable media include a variety of types of tangible storage media. The non-transitory computer readable media include a magnetic recording medium (such as a flexible disk, magnetic tape, or hard disk drive), magneto-optical recording medium (such as a magneto-optical disc), compact disc read-only memory (CD-ROM), compact disc recordable (CD-R), compact disc rewritable (CD-RW), semiconductor memory (such as a mask ROM, programmable ROM, erasable PROM (EPROM), flash ROM, and random access memory (RAM)). The program may also be supplied to a computer using one of transitory computer readable media. The transitory computer readable media include an electrical signal, an optical signal, and an electromagnetic wave. The transitory computer readable medium may supply the program to a computer via a wired communication path, such as an electric wire or an optical fiber, or a wireless communication path.

The technique of the disclosure may be applied to copying an original document.

The present disclosure contains subject matter related to that disclosed in Japanese Priority Patent Application JP 2018-141292 filed in the Japan Patent Office on Jul. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image reading unit that reads an image of an original document;
an image processing unit that processes image data of the image read by the image reading unit; and
a suspension unit that suspends, if a predetermined pattern has been detected from the image read by the image reading unit, the image processing unit in an operation of processing the image data until the original document is removed from the image reading unit.

2. The image processing apparatus according to claim 1, further comprising a message output unit that outputs, if the predetermined pattern has been detected from the image read by the image reading unit, a message to retrieve the original document from the image reading unit.

3. The image processing apparatus according to claim 2, wherein the message output unit continues outputting the message until the original document is removed from the image reading unit.

4. The image processing apparatus according to claim 2, wherein the message output unit starts outputting the message when a predetermined period of time has elapsed since detection of the predetermined pattern from the image read by the image reading unit.

5. The image processing apparatus according to claim 1, wherein the suspension unit is activated if a user is a predetermined user or the suspension unit is not activated if the user is not the predetermined user.

6. The image processing apparatus according to claim 5, wherein a determination as to whether the user is the predetermined user is made in accordance with login information of the user.

7. The image processing apparatus according to claim 1, further comprising a second message output unit that outputs a message to retrieve a recording medium from a discharge tray if the recording medium having an image formed by an image forming unit remains in the discharge tray.

8. The image processing apparatus according to claim 1, further comprising a pattern detection unit that detects a predetermined pattern from the image read by the image reading unit.

9. The image processing apparatus according to claim 1, further comprising a utilization unit that serves as a pattern detection unit detecting a predetermined pattern from the image read by the image reading unit and utilizes an element external to the image processing apparatus.

10. The image processing unit according to claim 1, wherein the image processing apparatus is one of a multi-function apparatus and a copying apparatus.

11. A non-transitory computer readable medium storing a program causing a computer to operate as the image processing apparatus according to claim 1.

12. An image processing apparatus comprising:
an image reading unit that reads an image of an original document;
a removal determination unit that determines whether the original document has been removed from the image reading unit;
a user determination unit that determines whether a user is a predetermined user; and
a suspension unit that, with the user determined to be the predetermined user, performs an image processing operation if the original document is determined as being removed from the image reading unit or suspends the image processing operation if the original document is determined as being not removed from the image reading unit.

13. An image processing method comprising:
reading an image of an original document on an image reading unit;
processing image data of the image read in the reading; and
if a predetermined pattern has been detected from the image read in the reading, suspending processing of the image data until the original document is removed from the image reading unit.

14. An image processing method comprising:
reading an image of an original document on an image reading unit;

determining whether the original document has been removed from the image reading unit;

determining whether a user is a predetermined user; and with the user determined to be the predetermined user, performing an image processing operation if the original document is determined as being removed from the image reading unit or suspending the image processing operation if the original document is determined as being not removed from the image reading unit.

\* \* \* \* \*